United States Patent Office 3,300,429
Patented Jan. 24, 1967

3,300,429
AQUEOUS POLYMERIC BLENDS CONTAINING UREIDO MONOMER
Frank J. Glavis and William J. Keighley, Philadelphia, and Thomas H. Haag, Feasterville, Pa., assignors to Rohm & Haas Company, Philadelphia, Pa., a corporation of Delaware
No Drawing. Filed June 17, 1963, Ser. No. 288,527
7 Claims. (Cl. 260—29.6)

The present invention is concerned with blended aqueous dispersions of addition polymers which are adapted for use as, or in the making of, water-base coating and impregnating compositions which may be used as top coats but are especially useful as primers adapted to receive one or more top coatings of either aqueous or organic solvent type. The blended aqueous polymer dispersions of the present invention and water-base paints made thereof have outstanding properties including improved adhesion to various substrates, improved penetration of, and/or adhesion to, porous substrates, such as wood, textiles, paper, non-woven fabrics, masonry or plaster having a powdery or chalky surface, wood or other rigid substrate partly or wholly covered with a weathered or chalky surfaced print, especially oil-paint or alkyd-type paint, metal surfaces, either bright partly or wholly primed, or corroded over part or all of their exposed areas including rusty iron from which only the loose rust has been removed, as by a wire brushing or other mechanical action, corroded copper, brass, aluminum or magnesium, improved resistance to the collection of dust and dirt, and to sulfide staining, improved flow and leveling, improved hardness, toughness, and resistance to abrasion, improved wet-adhesion as contrasted with the adhesion mentioned above of the type involving the permanent adhesion of the dried and/or cured film on the substrate, and various combinations of these properties with each other. The present invention is concerned with both clear compositions as well as aqueous base paints containing pigments, dyes and/or other coloring material, adapted for both interior and exterior uses.

The present invention is concerned with the modification of aqueous addition polymer dispersions, generally obtained most conveniently by direct emulsion polymerization. The most important of these dispersions used in making water-based paints are polymers, including homopolymers and copolymers, of: (1) vinyl esters of an aliphatic acid having 1 to 18 carbon atoms, especially vinyl acetate; (2) acrylic acid esters and methacrylic acid esters of an alcohol having 1 to 18 carbon atoms, especially methyl acrylate, ethyl acrylate, butyl acrylate, 2-ethylhexyl acrylate, methyl methacrylate, ethyl methacrylate and butyl methacrylate; and (3) mono- and di-ethylenically unsaturated hydrocarbons, such as ethylene, isobutylene, styrene, and aliphatic dienes, such at butadiene, isoprene and chloroprene.

Poly(vinyl acetate) and copolymers of vinyl acetate with one or more of the following monomers: vinyl chloride, vinylidene chloride, styrene, vinyl toluene, α-methylstyrene, acrylonitrile, methacrylonitrile, one or more of the acrylic acid and methacrylic esters mentioned above are well-known as the film-forming component of aqueous base paints. Similarly copolymers of one or more of the acrylic or methacrylic acid esters mentioned above with or without one or more of the following monomers: vinyl acetate, vinyl chloride, vinylidene chloride, styrene, vinyltoluene, α-methylstyrene, acrylonitrile, and methacrylonitrile, are also more or less conventionally employed in aqueous base paints. The diene polymers are generally used in aqueous base paints in the form of copolymers with one or more monomers following: styrene, vinyltoluene, a-methylstyrene, acrylonitrile, methacrylonitrile, and the above-mentioned esters of acrylic acid or methacrylic acid. Homopolymers of ethylene, isobutylene, and styrene, and copolymers of one or more of these hydrocarbons with one or more esters, nitriles or amides of acrylic acid or of methacrylic acid or with vinyl esters, such as vinyl acetate and vinyl chloride, or with vinylidene chloride are also used. It is also quite common to include a small amount, such as ½ to 2.5% or more, of an acid monomer in the monomer mixture used for making the copolymers of all three general types mentioned above by emulsion polymerization. Acids used include acrylic, methacrylic, itaconic, aconitic, citraconic, crotonic, maleic, fumaric, the dimer of methacrylic acid, and so on.

These aqueous dispersions may be made using one or more emulsifiers or surfactants of anionic, cationic, or nonionic type. Mixtures of two or more emulsifiers regardless of type may be used, except that it is generally undesirable to mix a cationic with an anionic type in any appreciable amounts since they tend to neutralize each other. The amount of emulsifier may range from about 0.1 to 6% by weight or sometimes even more, based on the weight of the total monomer charge. When using a persulfate type of initiator, the addition of emulsifiers is often unnecessary and this or the use of only a small amount, e.g. less than about 0.5%, of emulsifier, may sometimes be desirable from the cost standpoint (elimination of expensive emulsifier).

The average particle size or diameter of these dispersed polymers may be from about 0.03 to 3 microns or even larger. In general, the molecular weight of these emulsion polymers are high, e.g. from about 100,000 to 10,000,000 viscosity average, most commonly above 500,000.

Water-base paints containing water-insoluble addition polymers made by emulsion polymerization are in common use today for coating interior surfaces and exterior masonry surfaces. This type of paint, however, has generally not been recommended for the coating of exterior wood surfaces, especially if they carry a layer of old, chalky paint, unless the surface is first primed with certain organic solvent paint systems such as an alkyd resin or oil-type paint.

It is an object of the present invention to provide an aqueous polymer system adapted to be applied directly as a clear, protective coating, or to be formulated into a pigmented coating system and then applied directly to any interior or exterior surface, including porous, chalky surfaces such as of soft-surfaced masonry, wood, or plaster carrying old chalky paint layers, etc. and capable of penetrating the chalky or powdery layer to assure adhesion of the coating even to surfaces carrying such a layer. Another object is to provide aqueous polymer dispersions which can serve as a primer for exterior surfaces and provide a good surface which is receptive to the subsequent application of conventional paints and enamels either of water-base or organic solvent types. Other objects and advantages of the invention will be apparent from the description hereinafter and they include the provision of a coating composition of aqueous character adapted to serve as a primer in protective multi-layer coating systems which are durable to weathering and ultraviolet light. Such objects also include the provision of an aqueous blended polymer system adapted to be converted in conventional fashion into coating compositions which are stable against repeated freezing and thawing and are stable to polyvalent metal ions.

The objects of the present invention are attained by providing, and applying as a prime coat, or as the single coat of a one-coat system, on the surfaces to be protected, a clear or pigmented aqueous system containing a mixture comprising in certain proportions (1) a water-insoluble copolymer dispersed therein as finely-divided particles, (2) a water-soluble ammonium salt of a low molecular weight acid copolymer, and (3) at least one dispersing agent selected from the group consisting of non-ionic and anionic surfactants, one or both of components (1) and (2) containing at least ¼% of polymerized units containing a ureido group.

The improved compositions of the present invention comprise an aqueous dispersion of (1) a high molecular weight water-insoluble addition polymer selected from the group consisting of vinyl ester polymers, acrylic ester polymers, and vinyl-hydrocarbon polymers and (2) a low molecular weight water-soluble ammonium salt of a copolymer of copolymerizable monoethylenically unsaturated molecules containing about 2 to 15% by weight of an α,β-unsaturated acid, at least one of components (1) and (2) having copolymerized therein about ¼ to 30%, and preferably 1 to 5%, by weight of at least one monomer having a ureido group as defined hereinafter, and (3) at least one surface-active dispersing agent selected from the group consisting of non-ionic and anionic surfactants, the latter copolymer (2) being compatible with the former (1) and being capable of forming therewith on drying and/or curing, a glossy, coherent film (which is clear when unpigmented) which is tough and adherent to a wide variety of substrates, the adhesion to a given chalky substrate being improved over the adhesion of a corresponding composition in which the last-mentioned water-soluble copolymer is omitted (being replaced by a corresponding amount of the first-mentioned polymer). This composition formed of the three types of materials (1), (2), and (3) is herein designated "penetrating binder" or "polyblend" and may be used as such to provide a clear coating or may be formulated with other materials, such as pigments, to form all sorts of penetrating coatings or impregnants, such as water-base paints.

The relative amounts of the two essential polymeric components, hereinafter simply referred to as "component (1)" and "component (2)" respectively, in the mixture, hereinafter sometimes referred to as "the polyblend," may be varied in a wide range. However, this invention is primarily concerned with these compositions in which component (1) is about 15% to 65% by weight of the two components (1) and (2). Preferred proportions are 40 to 60% by weight of component (1) and 60 to 40% by weight respectively of component (2).

For most purposes the components (1) and (2) are of such constitution that each is capable of forming a continuous film when an aqueous dispersion containing only the particular component is allowed to dry while exposed to the ambient atmosphere normally prevailing when the painting or impregnation is carried out. The apparent second order transition temperature ($T_i$) of each polymeric component accordingly should not be over 30° C. and is preferably not over about 20° C. The $T_i$ value referred to is the apparent second order transition temperature or inflection temperature which is found by plotting the modulus of rigidity against temperature. A convenient method for determining modulus of rigidity and transition temperature is described by I. Williamson, British Plastics 23, 87–90, 102 (September, 1950). The $T_i$ value here used is that determined at 300 kg./cm.².

However, if one of the polymeric components has a relatively low $T_i$ value, as compared to the 20 to 30° C. range, the other may be correspondingly higher and sometimes even above 30° C. since in this case the former serves in effect to plasticize the latter. The water in the composition tends to plasticize polymers containing large proportions of vinyl acetate so that polymers of this type may have higher $T_i$ values even though the other polymeric component does not have a particularly low $T_i$ value. One or both polymer components may have $T_i$ values well above the temperatures mentioned and be satisfactory for use (1) if the product coated or impregnated thereby is of such a nature that it will normally be subjected to elevated temperatures during drying or after drying as in those cases where the coated or impregnated article is passed through a drying or baking oven or tunnel or (2) if a suitable plasticizer is included so that the plasticized polymer blend has a $T_i$ value (as determined in plasticized condition) in the range of about −40° C. to about +30° C. Thus, the polymer blend may have a $T_i$ value in a wide range depending on the conditions of drying and/or curing to which it may be subject. However, for most purposes in which an aqueous base paint is used in temperate climates, the polymer blend, in whatever condition of plasticization it may be in, whether as a result simply of the interaction between the two polymers, the effect of the aqueous medium thereon, the effect of any plasticizer, temporary or fugitive, or any combination of these influences, should have a $T_i$ value not over about 30° C. and preferably not over 20° C. When the aqueous base system is to be used in torrid zone climates, the $T_i$ may be substantially increased, whereas it should be reduced if use is intended for cold climates.

The particle size of the dispersed polymer may be from about an average size of 0.03 micron up to 3 or more microns, but is preferably in the range of 0.2 to 0.5 micron. It is to be understood that each of the two essential types of polymeric components may consist of a single polymer or either one or both components may consist of a mixture of two or more polymers of the type, the total amount of polymers of the component (1) type constituting from 15 to 65% by weight of the total amount of polymers in the mixture of components (1) and (2).

The presence of the ureido group in one or both of the polymers of components (1) and (2) is essential to avoid difficulties with "blistering" caused by exposure of the coated substrates to humid atmospheres. Normally, the exposure of compositions comprising substantial proportions of a water-soluble polymer to humid atmospheres gives rise to numerous small bubbles or blisters as a result of excessive water-sensitivity. It has been found, however, that this excessive sensitivity to moisture and tendency to blister can be overcome by including a small proportion of a monomer containing a ureido group in either or both of the polymers in the compositions of the present invention.

The ureido group may be of straight chain or cyclic type. A typical group of monomers containing a ureido group of the former type may be represented by the compounds of the general Formulas I and II as follows:

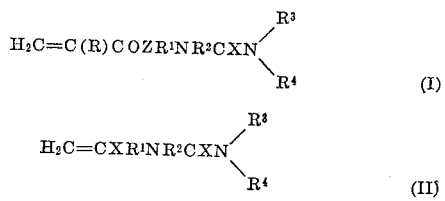

wherein

R is selected from the group consisting of H, methyl, and ethyl,

Z is selected from the group consisting of —O— and —NR⁵, R⁵ being selected from the group consisting of H, cyclohexyl, benzyl, and an alkyl group having 1 to 6 carbon atoms, R¹ is an alkylene group having 2 to 10 carbon atoms, R² is selected from the group consisting of H, cyclohexyl, benzyl, hydroxyalkyl groups having 1 to 4 carbon atoms, alkoxyalkyl groups having 2 to 6 carbon atoms, and alkyl groups having 1 to 6 carbon atoms, R³, when not directly attached to R⁴, is selected from the group consisting of H, phenyl, benzyl, cyclohexyl, hydroxyalkyl groups having 1 to 4 carbon atoms, alkoxyalkyl groups having 2 to 6 carbon atoms, and alkyl groups having 1 to 18 carbon atoms, $R^4$, when not directly attached to $R^3$, is selected from the group consisting of H, phenyl, benzyl, cyclohexyl, hydroxyalkyl groups having 1 to 4 carbon atoms, alkoxyalkyl groups having 2 to 6 carbon atoms, and alkyl groups having 1 to 18 carbon atoms, $R^3$ and $R^4$, when attached directly together, form a heterocyclic ring with the adjoining N atom of the formula and are selected from the group consisting of the morpholino residue ($=(CH_2CH_2)_2O$), the piperidino residue ($-(CH_2)_5-$), and the pyrrolidino residue ($-(CH_2)_4-$), and X is selected from the group consisting of oxygen and sulfur.

Preferred monomers contain a cyclic ureido group of the Formula III as follows:

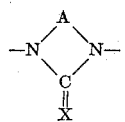
(III)

in which A is an alkylene group having 2 to 3 carbon atoms, such as $-CH_2CH_2-$, $-CH(CH_3)CH_2-$ and $-CH_2CH_2CH_2$.

The preferred compounds are those which contain the group:

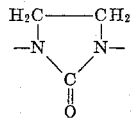
(IV)

which may be termed the cyclic N,N′-ethyleneureido group.

One of the nitrogen atoms of the cyclic ureido group of Formulas III or IV is attached to a monoethylenically unsaturated radical by virtue of which the compound is capable of addition polymerization and the other nitrogen atom is attached to a member selected from the group consisting of H, alkylol having 1 to 4 carbon atoms (preferably methylol), alkoxyalkyl having 2 to 6 carbon atoms (e.g. methoxymethyl) or an aminoalkyl group having 2 to 9 carbon atoms. Preferably the latter nitrogen atom is attached to a hydrogen atom.

Compounds of the following formulas wherein Y represents the group of Formula III above are typical ureido containing monomers:

$H_2C=CHYH$     (V)

$H_2C=CHXAYH$     (VI)

wherein X and A are as defined hereinabove;

(VII)

where R, Z and A are as defined hereinabove;

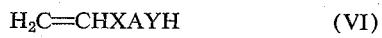
(VIII)

wherein R is as defined hereinabove;

(IX)

wherein R and A are as defined hereinabove; and the N-[omega-(1,3-cyclodiazolidin-2-onyl)-alkyl]-substituted unsaturated amic acids, their esters, and cyclic imides disclosed and claimed in U.S. Patent 2,980,652, the disclosure of that patent being incorporated herein by reference. These compounds are not readily represented in generic scope by a single formula. The acids are those in which the nitrogen atom of maleamic acid, chloromaleamic acid, fumaramic acid, itaconamic acid, or citraconamic acid is substituted by, and directly connected to a group of the formula

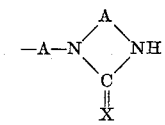
(IIIA)

wherein A and X are as defined hereinabove. The esters may be formed from the substituted acids by esterification with an alkanol having 1 to 4 carbon atoms and the internal cyclic imides are obtainable by dehydration of the substituted amic acids. The N-substituted amic acid and esters derived from maleamic acid are typical and have the following generic formula:

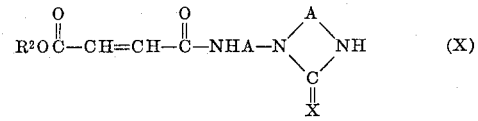
(X)

in which $R^2$, A and X are as defined hereinabove. The internal cyclic imides derived from malamic acid have the formula

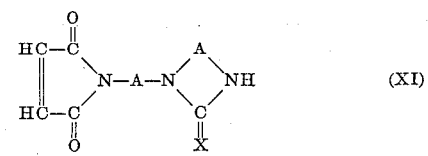
(XI)

Another type of cyclic ureido group-containing monomer are those of the formula

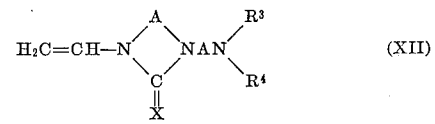
(XII)

wherein A, $R^3$, $R^4$ and X are as defined hereinbefore.

The unsaturated dicarboxylic acid monoesters of a compound of the formula

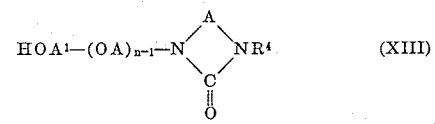
(XIII)

wherein $A^1$ is a ($C_2$–$C_8$)-alkylene group, $n$ is an integer having a value of 1 to 4, and A and $R^4$ are as defined hereinbefore, derived from maleic, fumaric, chloromaleic, itaconic, or citraconic acid are also useful. There may also be used the benzyl, cyclohexyl and ($C_1$–$C_6$)-alkyl esters of any of the monoesters just described which are disclosed in the copending application of Emmons and Falgiatore, Serial No. 112,507, filed May 25, 1961, now U.S. Patent 3,194,792 and the specific compounds disclosed therein are incorporated herein by reference. Specific examples include:

(a) β-(N,N′-ethyleneureido)ethyl acid maleate,
(b) β-(N,N′-ethyleneureido)ethyl acid fumarate,
(c) Methyl β-(N,N′-ethyleneureido)ethyl fumarate,
(d) Butyl β-(N,N′-ethyleneureido)ethyl fumarate.

Specific examples of the compounds represented by the several Formulas I, II and V to XII given above and some of their derivatives include:

A. FORMULA I (1) β-Ureidoethyl acrylate,
(2) β-Ureidoethyl methacrylate,
(3) N-methylol-N′-methacryloxethylurea,
(4) β-Thioureidopropyl methacrylate.

B. FORMULA II (1) β-Ureidoethyl vinyl ether,
(2) β-Ureidoethyl vinyl sulfide, (3) 5-ureidopentyl vinyl sulfide,
(4) β-Thioureidopropyl vinyl sulfide,
(5) β-Thioureidoethyl vinyl ether.

C. FORMULA V (1) N-vinyl-N,N'-ethyleneurea,
(2) N-vinyl-N,N'-ethylenethiourea,
(3) N-vinyl-N'-methylol-N,N'-ethyleneurea,
(4) N-vinyl-N'-methoxymethyl-N,N'-ethyleneurea,
(5) N-vinyl-N,N'-trimethyleneurea,
(6) N-vinyl-N,N'-propyleneurea.

D. FORMULA VI (1) N-vinyloxyethyl-N,N'-ethyleneurea,
(2) N-vinylthiopropyl-N,N'-propyleneurea,
(3) N-vinyloxyethyl-N,N'-ethylenethiourea,
(4) N-vinyloxyethyl-N-methylol-N,N'-ethyleneurea,
(5) N-vinyloxyethyl-N-ethoxymethyl-N,N'-ethyleneurea,
(6) N-vinylthioethyl-N-methylol-N,N'-ethyleneurea.

E. FORMULA VII (1) N-(β-acrylamidoethyl)-N,N'-ethyleneurea,
(2) N-(β-methacrylamidoethyl)-N,N'-ethyleneurea,
(3) N-(β-acrylamidopropyl)-N,N'-propylenethiourea,
(4) N-(β-methacrylamidoethyl)-N-methylol-N,N'-ethyleneurea,
(5) N-(β-acrylamidoethyl)-N-butoxymethyl-N,N'-ethyleneurea,
(6) N-(β-acryloxyethyl)-N,N'-ethyleneurea,
(7) N-(β-methacryloxypropyl)-N-methylol-N,N'-propyleneurea,
(8) N-(β-acryloxyethyl)-N-methoxymethyl-N,N'-ethyleneurea,
(9) N-(β-acryloxyethyl)-N-methylol-N,N'-ethylenethiourea,
(10) N-(3-acryloxypropyl)-N,N'-trimethyleneurea.

F. FORMULA VIII (1) N-acrylamidomethyl-N,N'-ethyleneurea,
(2) N-metharcylamidomethyl-N,N'-ethyleneurea,
(3) N-acrylamidomethyl-N-methylol-N,N'-ethyleneurea,
(4) N-acrylamidomethyl-N-methylol-N,N'-ethylenethiourea
(5) N-acrylamidomethyl-N-methylol-N,N'-propyleneurea,
(6) N-methacrylamidomethyl-N,N'-trimethyleneurea.

G. FORMULA IX (1) N-[β-(α-acryloxyacetamido)ethyl]-N,N'-ethyleneurea,
(2) N-[β-(α-acryloxyacetamido)ethyl]-N-methylol-N,N'-ethyleneurea,
(3) N-[β-(α-methacryloxyacetamido)ethyl]-N,N'-ethyleneurea,
(4) N-[β-(α-methacryloxyacetamido)ethyl]-N-methylol-N,N'-ethylenethiourea,
(5) N-[β-(α-methacryloxyacetamido)propyl]-N,N'-propyleneurea,
(6) N-[β-(α-acryloxyacetamido)propyl]-N,N'-trimethyleneurea,
(7) N-[β-(α-methacryloxyacetamido)ethyl]-N-methylol-N,N'-ethyleneurea.

H. FORMULAS X, XI AND RELATED COMPOUNDS FROM OTHER UNSATURATED DICARBOXYLIC ACIDS (1) N-[β-(β-carboxyacrylamido)ethyl]-N,N'-ethyleneurea,
(2) N-[β-(β-carbomethoxyacrylamido)ethyl]-N,N'-ethyleneurea,
(3) N-[β-(α-carboxymethylacrylamido)ethyl]-N-methylol-N,N'-ethyleneurea,
(4) N-[β-(β-carboxy-β,α-butenoamido)ethyl]-N,N'-ethyleneurea,
(5) N-[β-(β-trans-carbomethoxyacrylamido)ethyl]-N,N'-ethyleneurea,
(6) N-[β-(2-keto-1-imidazolinyl)-ethyl]maleimide,
(7) N-[β-(2-keto-1-hexahydroxypyrimidinyl)propyl]-maleimide,
(8) N-[β-(2-keto-1-imidazolidinyl)ethyl]itaconimide,
(9) N-[β-(β-carboxyamido)propyl]-N-methylol-N,N'-propyleneurea,
(10) N-[β-(β-carboxyamido)ethyl]-N,N'-ethylenethiourea,
(11) N-[β-(β-carboxyamido)ethyl]-N-methoxymethyl-N,N'-ethyleneurea.

I. FORMULA XII (1) N-dimethylaminoethyl-N'-vinyl-N,N'-ethyleneurea,
(2) N-diethylaminoethyl-N'-vinyl-N,N'-propyleneurea,
(3) N-diethylaminoethyl-N'-vinyl-N,N'-trimethylenethiourea.

Water-insoluble polymers and copolymers (whether or not containing a ureido group) that can be used in the composition of the present invention may be made by direct emulsion polymerization of the monomers involved, including the monomer containing the ureido group if its presence is desired in component (1). Alternatively, the copolymers may be produced by polymerizing monomers including one or more of such constitution that it or they can be converted after polymerization by suitable reaction into units having the groups desired, such as the ureido groups required in either polymeric componets (1) or (2). For example, itaconic anhydride may be copolymerized in the proper relative proportion with another monomer, such as any of those used in making polymeric component (1) and then reacted with an amine of the formula

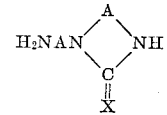

in which A and X are as defined hereinabove to thereby introduce the cyclic ureidoalkyl substituent into the polymerized anhydride unit which is converted into the N-cyclic ureidoalkyl-substituted amic acid.

Polymeric components (2) may be separately formed, as by aqueous or organic solvent solution polymerization or by aqueous emulsion polymerization on the acid side. The aqueous solution or dispersion of the acid copolymer may then be mixed into the aqueous dispersion of polymeric components (1) in appropriate proportions, the acid copolymer being partially or completely neutralized with ammonium hydroxide before, during or after such mixing. A polymer prepared in an organic solvent is, of course, put into aqueous solution and then mixed with component (1). Alternatively, component (2) may be prepared by copolymerization of the ammonium salt of the acid monomer in an aqueous dispersion of the several monomers required. It is essential that the ammonium salt be water-soluble. When the acid content of the copolymer is below 5%, the water-solubility of the ammonium salt may be assured by using a copolymer in the lower portion of the molecular weight range hereinafter specified, or by incorporating into the same copolymer other hydrophilizing or solubilizing monomers than the acid. Examples include acrylamide, methacrylamide, N-methylolacrylamide, N-methoxymethylacrylamide, β-hydroxyethyl acrylate, hydroxyethoxyethyl acrylate, and N-β-hydroxyethyl methacrylamide. Reference herein to the ammonium salt of the copolymer is intended to refer to the salts which contain the $NH_4^+$ ion and in which the neutralization, whether partial or complete, is that obtained essentially entirely by the ammonium ion whose formula is given.

The monomer containing the ureido group, or convertible to introduce a ureido group, may be copolymerized with one or more other monoethylenically unsaturated monomeric compounds copolymerizable therewith which are appropriate to form either polymer components (1) or (2).

Examples of the monomeric compounds which are useful in making polymeric component (1) are vinyl esters of fatty acids having from 1 to 18 carbon atoms, acrylic acid esters or methacrylic acid esters of a saturated alcohol having 1 to 18 carbon atoms, acrylonitrile, methacrylonitrile, glycidyl acrylate, glycidyl methacrylate, styrene, vinyltoluene, vinyl chloride, vinylidene chloride, vinyl ($C_1$–$C_8$)-alkyl ethers, N-mono- or N,N-di-(($C_1$–$C_{18}$)-alkyl)-substituted acrylamides or -methacrylamides, ethylene, propylene, isobutylene, chlorotrifluoroethylene, tetrafluoroethylene, and any other such monomer which does not render the copolymer water-soluble under the conditions of pH the aqueous compositions comprising the copolymers are to be used. Small amounts such as about ½ to 2.5% and in some cases up to 5% or 10% by weight, based on the weight of the polymer, of hydrophilic monomers may be used provided they are not used in such large amounts as to render the particular copolymers prepared soluble in water under the conditions of formulation and use of the compositions. Examples of these monomers include acids, such as acrylic acid, methacrylic acid, itaconic acid, maleic acid, aconitic acid, and so on; amides, such as acrylamide, methacrylamide, N-methyl acrylamide, N-methylol methacrylamide, alcohols such as β-hydroxyethyl or β-hydroxypropyl acrylate or methacrylate, N-hydroxyethyl-acrylamide, and amines, such as β-aminoethyl vinyl ether, dimethylaminoethyl acrylate or methacrylate, dimethylaminoethyl vinyl ether or sulfide, and N-(dimethylaminoethyl)-acrylamide.

Preferred polymers meeting the requirements of polymeric component (1) are those obtained by aqueous emulsion polymerization of monoethylenically unsaturated molecules comprising at least 50% by weight of at least one ester of an acid of the formula

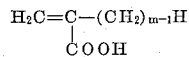

in which $m$ is an integer having a value of 1 to 3, with an alkanol having from 1 to 4 carbon atoms, using a suitable emulsifying agent. A non-ionic or anionic emulsifier may be used in this polymerization and it may be used in an amount from about 1% to 10% or more by weight, based on the total monomer weight. The emulsifier used in preparing polymeric component (1) may be the source of all or part of the non-ionic or anionic surfactant required in the composition. Alternatively, part of the necessary non-ionic or anionic surfactant may be added to either component (1) or (2) or to the mixture thereof after the polymerization or mixture thereof. Generally, any appreciable amount of cationic emulsifier should be avoided and preferred compositions are those in which the emusifier consists predominantly, or, better yet, exclusively of non-ionic emulsifiers or surfactants.

Polymeric component (2) of the composition is a water-soluble salt of a copolymer formed predominantly of acrylic monomers which contains from 2 to 15% by weight of an α,β-monoethylenically unsaturated carboxylic acid. Preferred acids are acrylic acid, methacrylic acid, methacryloxyacetic acid, methacryloxypropionic acid, methacryloxyacetobutyric acid, or itaconic acid, although other acids may be used including crotonic, maleic, fumaric, or aconitic. The acid copolymers are converted to a water-soluble ammonium salt.

The molecular weight of the acid copolymer from which the ammonium salt is to be produced should be relatively low as compared to the usual acid copolymers of this type. In general, the molecular weight should be such that a solution of 35% by weight of the ammonium salt of the copolymer in water, after standing for a week under atmospheric conditions, has a viscosity of about 5 to 100 centipoises at a temperature of 25° C. and a pH of 6.5 to 7.5. This embraces a preferred range of molecular weight from about 5000 to about 15,000 number average as determined by osmometric methods in benzene. The main part of the acid copolymer used to form the salt is preferably formed from a lower alkyl ester of acrylic acid or of methacrylic acid in which the alkyl group has from 1 to 4 carbon atoms, and most preferably from 1 to 2 carbon atoms. For example, copolymers of ethyl acrylate, methyl acrylate, or butyl acrylate, or of mixtures thereof with 2 to 5% by weight of acrylic acid, methacrylic acid, itaconic acid or other acid may be employed provided they are sufficiently low in molecular weight to assure that their ammonium salts are water-soluble. Otherwise, other solubilizing monomers must be present in the copolymer. Copolymers of 18 to 69% by weight of one or more of the lower acrylates just mentioned with 0 to 80% by weight of methyl methacrylate and 2 to 15% by weight of acrylic acid or methacrylic acid are also suitable. Copolymers obtained by grafting the acid component on a polymer backbone formed of the other monomer or monomers may be used. However, the products of simple copolymerization and especially those in which the acid groups are most uniformly distributed along the polymer molecules are generally adequate and frequently preferable. In general, the salt of component (2) should not be so high in molecular weight or be present in such large amount in the penetrating binder that the viscosity thereof at 40% solids concentration, 25° C., and a pH of 9.5 exceeds 250 cps. when measured in a Brookfield viscosimeter using a No. 2 diameter spindle at 60 r.p.m.

Up to 20% by weight of the acid copolymer may be formed of polymerized units of other character introduced for special purposes such as to improve pigment-dispersion, adhesion to particular surfaces, resistance to heat, light, especially ultraviolent, or to staining, or for the purpose of introducing a reactive group to facilitate insolubilization on ageing to improve gloss, or to accomplish any of the purposes just mentioned. Examples of these other monomers include: long chain esters of acrylic or methacrylic acid in which the moiety of the ester derived from an alcohol has from 5 to 18 carbon atoms, such as cyclohexyl acrylate, 2-ethylhexyl methacrylate, and stearyl acrylate; vinylidene chloride, vinyltoluene, styrene, α-methyl-styrene, vinyl chloride, acrylonitrile, methacrylonitrile, vinyl acetate, amides such as acrylamide, methacrylamide, or their N-methylol derivatives, the glycidyl group such as glycidyl methacrylate and glycidyl acrylate, those containing hydroxyl groups such as β-hydroxyethyl or β-hydroxypropyl methacrylate or acrylate, and those containing amine groups such as β-(dimethylaminoethyl) methacrylate or acrylate, ureido-containing monomers such as ureidoethyl vinyl ether or sulfide, ureidoethyl acrylate or methacrylate, N-ureidoethyl acrylamide or N-ureidoethyl methacrylamide, and especially monomers of the formulas above containing the cyclic ureido groups. These special groups may be included whether or not the soluble polymer contains a monomer having a ureido group as defined hereinabove. When this polymer contains both a monomer containing a ureido group and monomers containing these other special groups, the total weight of such monomers should generally not exceed 20%.

The acid copolymers of low molecular weight to be used as the ammonium salts may be prepared in a variety of ways. For example, they may be prepared by polymerizing the appropriate monomers in an organic solvent such as acetone, 2-ethoxyethanol, or tert-butanol. Alternatively, they may be polymerized in bulk or in aqueous media and in the latter case as a stable latex or dispersion. In some cases, it may be necessary to employ a chain regulator in order to provide a molecular weight in the low range desired. This is particularly the case when polymerizing in aqueous media as by emulsion polymerization procedures. Examples of chain-regulators that may be employed include long-chain alkyl mercaptans, e.g. tert-dodecyl mercaptan of the formula $$H_3CC(CH_3)_2CH_2C(CH_3)_2CH_2C(CH_3)_2SH$$

isopropanol, isobutanol, long-chain alcohols, e.g. lauryl alcohol, tert-octyl alcohol, cumene, hydroxylamine, and halogenated hydrocarbons, e.g. $CCl_4$, $C_2Cl_4$, and $CBrCl_3$. The amount of chain regulator that may be used depends upon the particular system and the conditions and may vary from 0 to 2% or more based on the weight of monomers. Generally, the use of 0.1 to 1% of the chain transfer agent, such as bromotrichloromethane, serves to provide as wide a range of molecular weights in aqueous media as is required.

After preparation of the acid copolymer, it is converted into the water-soluble ammonium salt. When the acid polymer is prepared in a solvent such as acetone, the polymer may be isolated from the solution by precipitation therefrom and thereafter treated with the ammonium hydroxide to convert the acid copolymers into soluble form.

The acid copolymer may be prepared by an emulsion polymerization technique using an anionic or a non-ionic emulsifying agent. For reasons which will appear hereinafter, the use of a non-ionic agent is preferred. When the polymer is prepared in an aqueous medium, it is not ordinarily necessary to isolate the polymer from the medium before it is converted into the salt.

The third component that is essential to the composition is a non-ionic or anionic surface active agent. Typical anionic agents that may be used alone or in conjunction with non-ionic agents include the alkali metal or ammonium salts of higher fatty alcohol sulfates, such as sodium lauryl sulfate, the alkali metal salts of the sulfates or sulfonates of higher ($C_6$ to $C_{18}$) alkyl substituted phenoxypolyethoxyethanols having from 2 to 50 oxyethylene units per molecule, such as the sodium salt of tert-octylphenoxydiethoxyethyl sulfate, and the alkali metal salts of di-($C_6$–$C_{18}$)-alkyl sulfodicarboxylates, such as dioctylsulfosuccinates.

Preferred compositions are those in which the non-ionic agent constitutes at least 60% of the total weight of surfactant in the compositions, even after formulation with pigment, pigment dispersant, and any other auxiliary component to form an aqueous base paint; in unpigmented compositions, the surfactant is preferably at least 90% by weight non-ionic in character, and may be 95 to 100% for optimum results. The large proportion of non-ionic in the preferred systems generally stabilizes the system against coagulation by polyvalent metal ions such as calcium ions which commonly occur in inorganic cementitious substrates and to zinc ions which are quite common in chalky surfaces obtained from old paint. Typical non-ionic surface active agents which may be used include alkylphenoxypolyethoxyethanols having alkyl groups of about seven to twelve carbon atoms, such as heptylphenoxypolyethoxyethanols, octylphenoxypolyethoxyethanols, methyloctylphenoxypolyethoxyethanols, nonylphenoxypolyethoxethanols, dodecylphenoxypolyethoxyethanols, and the like; polyethoxyethanol derivatives of methylene linked alkyl phenols; sulfur-containing agents such as those made by condensing the required proportion of ethylene oxide with nonyl, dodecyl, tetradecyl, and the like mercaptans or with alkylthiophenols having alkyl groups of six to fifteen carbon atoms; ethylene oxide derivatives of long-chain carboxylic acids, such as lauric, myristic, palmitic, oleic, and the like, or mixtures of acids such as found in tall oil; ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, etc.

The proportion of the surface active agent in the penetrating binder should be from about 2.5 to about 11.0%, and preferably 6 to 8%, by weight based on the total weight of the water-insoluble polymer (component (1)) and the soluble polymer salt (component (2)). These proportions naturally need not include any dispersing agent that may be used for pigment dispersion in formulating the composition into a pigmented aqueous base paint.

The aqueous system should also be of alkaline pH. In other words, it should have a pH of at least 7.5. It may have a pH of 10.5 to 11, but is often undesirably viscous at this pH so that poor penetration of a chalky surface is obtained. Preferably, the pH is about 8 to 9.7.

In preparing the composition, the salt of the copolymer which forms the second component of the penetrating binder or polyblend as described hereinabove may first be prepared and then mixed with the emulsion polymer. In the event the amount of surface active agent employed in preparing the polymers is less when the water-insoluble polymer is mixed in proper proportion with the polymer salt than the minimum required proportion of 2.5% on the total weight of these polymers, additional anionic or preferably non-ionic surfactant is then added. The pH may be adjusted to the value desired by the addition of ammonium hydroxide.

The aqueous compositions may be composed essentially entirely of the mixture of polymer components (1) and (2) and surfactant (3) when it is desired to use the blend in situations where a clear impregnant, binder, or coating is needed. Thus, in the stabilization or crease-proofing of fibrous materials, e.g. woven fabrics of cellulose or wool and the bonding of nonwoven webs, or fabrics or in providing a clear, protective coating over printed matter on paper, leather or other substrates, the aqueous dispersions of the two polymeric components (1) and (2) and the surfactant (3) may be used without other auxiliary materials. The composition prepared simply by mixing the three essential components in the proper proportions may be applied as such as a clear primer to the chalky surfaces to be coated. The concentration at which the clear primer may be applied may range from about 10% to 50% solids. Instead of applying the 3-component composition as a clear primer, it may be modified by the introduction of fillers, pigments, and, optionally, additional dispersing agents, if necessary, to facilitate the dispersion of pigments. The weight ratio of pigment to binder (including soluble polymer salt and emulsion polymer) may range from 1:20 to 20:1. The clear or pigmented compositions may be modified with thickeners, plasticizers, fungicides, bactericides, dyes or tints, fragrances, or the like.

In making pigment-printing and dyeing compositions for application to textile fabrics and in making water-base paints, incorporation of pigment and/or dyes is important. The relative proportions of binder to pigment may fall in a wide range, such as from a ratio of 1:20 to 20:1 but for most purposes is from 0.5:1 to 5:1.

Pigment compositions used in interior and exterior house paints usually comprise hiding white pigments, other tints and colors ordinarily being obtained by mixing other colored paint pigments with the white pigments. Any of the inorganic and organic pigments, pigment lakes, insoluble dyes and other durable coloring matter ordinarily used in formulating durable exterior paints, varnishes, enamels and lacquers can be used in pigmenting the invention paint compositions. Typical useful white hiding pigments are: rutile titanium dioxide, anatase titanium dioxide, zinc oxide, leaded zinc oxide, zinc sulfide, lead titanate, antimony oxide, zirconium oxide, white lead, basic lead silicate, lithopone, titanated lithopone, titanium-barium pigment, titanium-calcium pigment and titanium-magnesium pigment. The titanium dioxide pigments ordinarily are preferred.

While the indicated pigmentation can be solely of hiding prime pigments, it is economically impractical to use solely prime pigments at the indicated high pigment volume concentrations. As is ordinary practice in paint formulation, the total pigment usually consists of hiding prime pigments extended with well-known pigment extenders such as calcium carbonate, gilders whiting, talc, barytes, magnesium silicates, aluminum silicates, diatomaceous earth, china clay, asbestine, silica and mica. The relative proportions of the prime white pigment and the pigment extender in the pigment mixture may be varied widely, but usually the hiding prime pigment is present at a pigment volume concentration which provides the desired paint covering power or hiding and the extender pigment is present in an amount which provides the paint with the desired total pigment volume concentration. Prime pigments and extender pigments range widely in density, but ordinarily white house paints and light tints thereof have a pigment composition whereof the extender pigment is present in the weight proportion of .4 to 4 parts per part of hiding prime pigment.

Pigments can be dispersed in the aqueous paint vehicle by any of the well-known techniques of pigment dispersion in paint formulation, such as roller milling, ball or pebble grinding, sand grinding as described in Hochberg U.S. Patent 2,581,414, paddle-mixer dispersion techniques, and other pigment paste techniques. The pigments can be dispersed in either of the aqueous polymer compositions prior to combining the respective compositions as the aqueous polymer polyblend, they can be dispersed in the preformed polyblend vehicle, or the pigments can be wet and dispersed in a separate aqueous slurry in the absence of the pertinent polymer compositions of the polyblend and then combined with the aqueous polymer polyblend by simple mixing. The order of combining the pigments is not significantly critical.

The pigment composition is preferably dispersed in the presence of a water-soluble and swellable colloidal bodying agent and an auxiliary surfactant in addition to any surfactants present in the polymer composition. The auxiliary surfactant for dispersing the pigment composition can be non-ionic or anionic, preferably of the water-soluble type. The selection of this dispersing surfactant is judicious to provide compatibility and non-reactivity with any surfactants of the polyblend paint vehicle. The surfactant for dispersing the pigment composition may be the same or different from the stabilizing surfactants of the polyblend. Ordinarily a concentration of up to 2% of the auxiliary pigment-dispersing surfactant based on the weight of the pigment composition is adequate, the preferred concentration being 0.1% to 1% on the indicated basis. It is preferred that the total amount of pigment dispersing surfactant and the stabilizing surfactants of the polyblend does not exceed 10% based on the total weight of components (1) and (2).

The rheological characteristics of the paint can be varied to suit the application needs. The presence of combined carboxylic acid units of the described copolymers are helpful in altering the rheological characteristics, particularly since carboxylic substituents are reacted with ammonium hydroxide to form the ammonium carboxylate of the ester copolymer. The aqueous dispersion paint ordinarily is adjusted to an alkaline state of 7.5 to 10 pH with ammonium hydroxide. In addition, polyacrylic acid, polymethacrylic acid, water-soluble or water-swellable copolymers of acrylic acid or methacrylic acid, or water-soluble and water-swellable carboxylates of copolymers of these acids can often be advantageously present in the composition to modify the rheological characteristics. These materials can be considered ancillary to the water-soluble copolymer constituting component (2). Water-soluble cellulose derivatives such as methyl cellulose, carboxymethyl cellulose or hydroxyethyl cellulose, especially methyl cellulose, can also be used for bodying purpose. These materials are used in their ordinary small effective proportions.

Another desirable ancillary component which is preferentially present in the aqueous dispersion paint composition is a volatile water-soluble organic anti-freeze agent to provide the aqueous paint with freeze-thaw stability. Ethylene glycol is especially useful for this purpose at concentrations up to about 5% by weight of the total composition. Other glycols and polyglycols can be used for this purpose.

Aqueous dispersion paint composition containing surfactants ordinarily foam unless selection of the dispersants is specifically directed to the inherently non-foaming species. Anti-foam agents are ordinarily included in the aqueous paint formulation to minimize foaming. High boiling alcohols, polyglycols, silicone liquids and other anti-foam agents well-known to the coating art can be included in the composition as an ancillary component.

As with conventional paints and enamels formulated from drying oils and from alkyd resins, the paints coalesced from the invention composition may exhibit fungus attack and, therefore, it is further desirable to include a preservative or fungicidal agent in the paint. Any of the well-known preservative agents used in paint formulations can be used in their usual small effective proportions. Phenyl mercury oleate and other phenyl mercurial fungicides are especially useful at active concentrations from .05 to .3% by weight of the composition.

The paint compositions of this invention ordinarily are adequately flexible that external plasticization of the polymer polyblend is unnecessary. However, ancillary plasticizer can be included in the composition in a minor proportion up to 10% by weight of the polyblend, preferably no more than 5%. Presence of this small proportion of ancillary plasticizer sometimes is advantageous toward improving the freeze-thaw characteristics of the aqueous product when used in combination with the water-soluble glycol-type anti-freeze agent. Non-volatile ester plasticizers, for example, the phosphates, such as tricresyl phosphate, and the phthalates, such as dibutyl phthalate, or the "Santicizer" plasticizers can be used.

While the total non-volatile content of the aqueous dispersion paint composition, ordinarily designated as the solids content, can vary widely, it is desirable that the non-volatile content be at least 30% by weight in order that a practical amount of paint per coat is applied. The aqueous paint can be satisfactorily formulated at a non-volatile content as great as 70%, but at this concentration thinning with water is ordinarily necessary for satisfactory application. The preferred non-volatile content is from about 40% to 60% by weight.

The viscosity of the aqueous dispersion paint composition also can be varied widely. A Stormer viscosity of about 58 to 100 Krebs units) at 25° C. is a desirable ready-to-apply brush consistency. This is not a critical characteristic as the paint can be further modified satisfactorily with thixotropy controlling agents to provide the composition with non-drip characteristics with adequate brushout characteristics.

Other auxiliary materials that may be used include: dispersing agents for dispersing and maintaining in a finely divided state the pigments, colors, or extenders, such as aromatic sulfonates condensed with formaldehyde or any of the suitable commercial dispersing agents which are available for this purpose; sequestering agents for controlling polyvalent metal ions sometimes introduced by pigments, colors, or extenders, such as complex alkali metal phosphates or ethylene polyaminoacetates; defoaming agents including waxes, oils, or mineral spirits, or an alkylphenoxyethanol, fatty acid amides, phosphate esters, or a solution of an amine or amide in an oil; humectants, such as water-soluble gums, ammonium or sodium polyacrylate, glycol laurate, propylene glycol, diethylene glycol, etc.; thickeners, such as water-soluble gums, water-soluble polyacrylates and methacrylates, water-dispersed starches and proteins, etc.; bactericides and/or fungicides, such as borax, pentachlorophenols, or mercury compounds; perfume-like materials, including neutralizing and masking agents, which are used to overcome odors or to impart pleasant and distinctive odors; other resinous materials in dispersed form, such as alkyd resins, drying oils, or latices of styrene or of styrene and butadiene to cheapen and extend the binders of this invention, and auxiliary corrosion-inhibiting agents, such as sodium benzoate, sodium dichromate, guanyl urea phosphate, or sodium nitrite in an amount of 0.05% to 5%, and most commonly 0.1% to 2% of the dispersed copolymer, etc.

The compositions of the present invention may be of strictly thermoplastic character or they may be of thermosetting character, as when $R^3$ or $R^4$ is methylol or alkoxymethyl. The compositions may also comprise auxiliary components which impart, or enhance, the thermosetting qualities thereof. For example, there may be added an aldehyde, such as formaldehyde, an aminoplast or phenoplast, such as the resin-forming condensates of formaldehyde with phenol, urea, N,N'-ethyleneurea, 5-alkyl- or 5-hydroxyethyltriazones, aminotriazines, such as melamine, as well as the methylated derivatives of these condensates, poly(vic-epoxides) of aliphatic or aromatic types, alkyd resins, i.e. polyesters of polycarboxylic acids (e.g. phthalic, adipic, or sebacic) with a polyol (e.g. ethylene glycol, glycerol, trimethylolethane), and oil-modified types of alkyds containing from 25 to 60% of long-chain fatty acid or ester (e.g. soybean oil). The content of these auxiliary film-forming materials may be from 1% to 35% by weight of the total weight of polymeric components (1) and (2).

When the thermosetting forms of the compositions of the present invention are used, the coating or impregnation may simply be dried at room temperature or whatever exterior temperature may prevail at the time as would be done with the simple thermoplastic types, reliance for development of cure being placed upon ageing including exposure to sunlight for an extended period of time, e.g. several days, weeks, or in some cases, months. On the other hand, the cure of such films may be hastened by drying at elevated temperatures or heating at elevated temperatures (up to 200° C.) for several minutes to a half-hour after drying at room temperatures.

Compositions of the present invention in which component (2) polymer is an ammonium salt of a copolymer containing at least 5% by weight of an acid of Formula XIV above and about 2 to 5% by weight of a monomer containing a ureido group are preferred and are especially valuable for application to porous materials, e.g. textiles, paper, wood, masonry, asbestos-cement shingles or siding, surfaces carrying chalky weathered oil-base paint or alkyd paint, rusty and corroded metal surfaces, e.g. rusty iron, or corroded copper, zinc, and aluminum. These compositions have outstanding penetrability and adhesion characteristics.

The compositions of the present invention should contain at least ¼% by weight, based on the total weight of polymer components (1) and (2), of units or mers containing the ureido groups. While as much as 15% of such units may be present, it is generally true that the maximum effect or optimum properties are obtained when the composition contains about 0.5 to 2.5% by weight of the ureido group-containing mers or units, based on the total weight of components (1) and (2).

After the application of the compositions of the present invention as a clear or pigmented priming or sealing coat, there may be applied one or more additional coats of the same clear or pigmented composition to finish the coated article. Alternatively, the primer coat, whether clear or pigmented, formed of the composition defined hereinabove, may receive one or more topcoats of a conventional water-base paint, such as a paint based on a rubber or synthetic rubber latex, but preferably a paint based on an acrylic polymer such as those disclosed in U.S. Patent 2,795,564. Topcoats may also be applied from other aqueous systems such as copolymers of an acrylic ester with styrene, vinylidene chloride, acrylonitrile, vinyl acetate or vinyl chloride which copolymers may contain from ½ to 2½% of acid such as acrylic acid or methacrylic acid therein.

The compositions of the present invention, whether clear or pigmented, are characterized by outstanding penetration of surfaces carrying powdery layers, such as chalky paint layers or dusty, decomposed masonry or cementitious surfaces. The compositions are also characterized by outstanding durability to weathering, that is, subjection to humid and rainy atmospheres, as well as to ultraviolet light exposure. The compositions are stable to heat. The preferred compositions containing non-ionic surfactants are also stable against polyvalent metal ions. They are readily formulated using conventional techniques to be stable against repeated freezing and thawing cycles.

In making water-base paints, a preferred use of the present invention, the preferred formulations generally fall within the scope of the following tabulation, wherein the percentages indicate the solids content:

| Material: | Percent by Wt. |
|---|---|
| Aqueous dispersed polyblend | 10 to 30 |
| Pigment composition | 15 to 55 |
| Stabilizing and dispersing surfactants | 0.1 to 2.5 |
| Bodying or rheology control agent, e.g. sodium polyacrylate | 0 to 4 |
| Anti-freeze agent, e.g. ethylene glycol | 0 to 5 |
| Anti-foam agent, e.g. polypropylene glycol | 0 to 2 |
| Ammonium hydroxide—to pH value | 7.5 to 10 |
| Fungicidal preservative, e.g. phenyl mercurial salt | 0 to 1 |
| Water, balance to make 100. | |

The pigment volume concentration is preferably from 25% to 65%. The total of the dispersing and stabilizing surfactants is an amount no greater than 10% based on the weight of the polyblend. The rheology controlling water-soluble organic polymer having combined units of an alpha-beta monovinylidene monocarboxylic acid can be present in the acidic form or as the water-soluble carboxylate salt, such as the ammonium salt.

In the following examples, illustrative of the invention, the parts and percentages are by weight unless otherwise specifically indicated. The ureido compounds used therein are identified by reference to the several groups hereinabove; for example, C.2 is a compound of Formula III and is specifically N-vinyl-N,N'-ethyleneurea.

*Example 1*

An aqueous dispersion (100 parts) of a poly(vinyl acetate) containing about 48% of the polymer in which the average particle size of the polymer is about 3 microns is mixed with an aqueous solution (150 parts) containing 0.1% of sodium lauryl sulfate, 20% of an ammonium salt of a copolymer, having a molecular weight of about 65,000 viscosity average, of 71% ethyl acrylate, 20% methyl methacrylate, 6% methacrylic acid, and 3% of compound C.2. The first dispersion contained 3%, based on polymer weight, of t-octylphenoxypolyethoxyethanol (OPE$_{40}$) having an average of 40 oxyethylene units as the emulsifier. Then 2 parts of additional OPE$_{40}$ is added, giving a dispersion having about 32% solids.

The resulting composition is film-forming at normal prevailing temperature. It forms an excellent clear coating for paper, especially for the protection of the printed covers of paper-backed books. For this purpose, a somewhat harder but still flexible coating is obtained from the composition when it is modified by the incorporation of formaldehyde or about 10% (on total weight of polymer) of a fully methylated polymethylol melamine and the drying is effected at a temperature of about 110° C. for about 10 minutes.

*Example 2*

(a) A pigment dispersion is prepared by mixing 10 lbs. of a 25% aqueous solution of the amomnium salt of a 1:1 mole ratio copolymer of diisobutylene and the imide of maleamic acid and 4 lbs. of a 35% aqueous solution of diisobutylphenoxypoly(40)ethoxyethanol, with about two lbs. of an antifoaming agent (e.g. a long chain alcohol), 123 lbs. of rutile titanium dioxide, 222 lbs. of calcium carbonate, 30 lbs. of ethylene glycol, and 50 lbs. of water until well dispersed.

The resulting pigment paste is mixed with 800 lbs. of the aqueous dispersion of the polyblend obtained in Example 1, 8 lbs. of di(phenylmercuric)dodecenyl succinate, and about 12 lbs. of a 22% aqueous solution of sodium polyacrylate. The mixture is then adjusted to a pH of about 9.5, using about 10 lbs. of 28% ammonium hydroxide. The resulting paint had a total solids content of about 47.5%, and a viscosity of 58 to 63 Krebs units (k.u.).

The composition thus prepared was quite useful as a primer for wood having an old layer of chalked paint thereon, penetrating the chalky layer and adhering the dried coating well to the wood.

The paint was also applied to wood, concrete, and metal surfaces carrying an old coating of severely chalked paint, a dusty surface, and a powdery corroded surface respectively. In each case, the paint penetrated the powdery surfaces and adhered well to the substrate.

(b) The coated articles obtained in part (a) were provided with additional coats of the same water-base paint as used for the prime coat, giving a well-protected painted product. Instead of applying a topcoat of the same paint as was used in the primer, some coated articles obtained as in parts (b) and (c) were topcoated with (a) a conventional base paint containing a polyacrylic resin, and in some instances with (b) a conventional oil-base paint. Good adhesion to both types of topcoats was obtained.

*Example 3*

A polyblend is prepared from
(a) A 49% solids aqueous dispersion of an emulsion copolymer of a monomer mixture consisting of ethyl acrylate:methyl methacrylate:monomer G.3.:methacrylic acid in a weight ratio of 55:39:5:1 using 3%, on monomers, of tert-octylphenoxypoly(15)ethoxyethanol as an emulsifier;

(b) A 20% aqueous solution of a water-soluble copolymer having a molecular weight of about 15,000 number average, prepared by ammonia-solubilization of a copolymer of ethyl acrylate and methacrylic acid, in a weight ratio of 95:5, and prepared by reflux polymerization in water with 1.0%, based on monomer weight, of potassium persulfate as initiator and with ½%, based on monomer, of sodium lauryl sulfate and with 2% dodecyl mercaptan (based on monomer weight); and (c) Octylphenoxypoly(35)ethoxyethanol, in a weight ratio (solids) of 100 parts of (a), 100 parts of (b) and 12 parts of (c). A sample of this blend, when placed on top of a synthetic chalk contained in a tube, completely penetrated the synthetic chalk. Another sample of the blend when painted over a powdery substrate comprising a weathered oil-painted wood, adhered well thereto.

*Example 4*

A paint with excellent penetration of chalky surfaces and adhesion was prepared as in Example 2 replacing the polyblend dispersion there used with 850 parts of the polyblend of Example 3.

*Example 5*

Examples 3 and 4 are repeated, except that the emulsion polymer (a) of Example 3 is prepared from a monomer mixture consisting of ethyl acrylate:methyl methacrylate:monomer D.2.:methacrylic acid in a weight ration of 60:29:10:1. Excellent adhesion to weathered, chalky substrates is obtained upon painting on the surfaces described.

*Example 6*

Examples 3 and 4 are repeated except that the water-soluble polymer (b) of Example 3 has a number average molecular weight of about 10,000 and is prepared from a monomer mixture consisting of ethyl acrylate:methacrylic acid:β-ureidoethyl methacrylate in a weight ratio of 80:15:5. The polyblend penetrates the synthetic chalk completely and the paint has excellent adhesion to the substrates mentioned.

*Example 7*

Examples 3 and 4 are repeated in several runs A through I except that the ureido-containing monomers in the polymers (a) were as indicated in the following table:

| Run: | Monomer |
|---|---|
| A | A.3. |
| B | B.1. |
| C | C.1. |
| D | E.2. |
| E | F.2. |
| F | G.5. |
| G | H.2. |
| H | I.1. |
| I | β - N,N' - ethyleneureido)-ethyl acid fumarate. |

Good penetrating and adherent polyblends and paints are obtained.

*Example 8*

(a) A polyblend was prepared by mixing 100 parts of a 47% solids latex of a copolymer of 65% butadiene and 35% styrene containing 5%, on the copolymer, of sodium lauryl sulfate as emulsifier and 500 parts of a 22% solids aqueous solution of an ammonium salt of a copolymer, having a number average molecular weight of 12,000, of 30% styrene, 20% vinyl acetate, 39.5% butyl acrylate, 8% acrylic acid, and 2.5% monomer C.1 of the specification, dispersed by 1%, on copolymer, of sodium lauryl sulfate, and 6 parts of sodium lauryl sulfate.

(b) Paints having good chalk-penetrating qualities and adhesion to the substrate are obtained by using the polyblend of part (a) in making a paint by the procedure of Example 2.

*Example 9*

Unglazed cement asbestos shingles were coated with commercial Bondex paint and weathered to obtain severe powdering of the surface. This surface was coated with clear formulations of Example 3. This primer coat was then given a topcoat of a standard acrylic exterior house paint. Excellent bonding to the chalking substrate and excellent outdoor durability were obtained.

*Example 10*

The paint of Example 2 is applied as a primer to weathered, heavily-chalked painted surfaces on houses. This primer is then top-coated with standard exterior acrylic latex house paints. This system has given excellent bonding to the substrate, excellent durability, with freedom from blistering, flaking, peeling, cracking or other undue failure.

We claim:
1. A composition adapted to form flexible, tough, adherent, coating and impregnant films comprising an aqueous dispersion of (1) a water-insoluble addition polymer selected from the group consisting of vinyl ester polymers, acrylic ester polymers, and vinylhydrocarbon polymers, and (2) a water-soluble ammonium salt of a copolymer, having relatively low molecular weight, of monoethylenically unsaturated molecules comprising 2 to 15% by weight of an $\alpha,\beta$-ethylenically unsaturated carboxylic acid, and (3) 2.5 to 11% by weight, based on the total weight of components (1) and (2) of at least one surfactant selected from the group consisting of anionic and nonionic surfactants, at least one of components (1) and (2)

comprising at least ¼%, based on the weight of the respective component, of polymerized monomer units containing a ureido group, the polymeric components (1) and (2) being compatible to form an adherent film on a substrate, component (1) being present in an amount of 15 to 65% by weight based on the total weight of components (1) and (2), and the relative amounts of components (1) and (2) being predetermined to provide from ¼ to 15% by weight, based on the total weight of (1) and (2), of polymerized monomer units containing the aforesaid ureido group.

2. A coating composition comprising water, a water-soluble ammonium salt of a copolymer of monoethylenically unsaturated molecules comprising 2 to 15% by weight of a copolymerizable α,β-monoethylenically unsaturated carboxylic acid dissolved in the water, the molecular weight of the salt being such that the viscosity of a solution of 35% thereof in water at a pH of 6.5 to 7.5 and at 25° C. is about 5 to 100 cps., a water-insoluble polymer having an apparent second order transition temperature of not over 30° C., and a viscosity average molecular weight of at least about 100,000 dispersed in the water, and a surface-active agent selected from the group consisting of anionic and nonionic surfactants, at least one of the copolymer salt and the water-insoluble polymer containing polymerized units of a monomer having a ureido group therein, the proportion of the latter units being from ¼ to 15% by weight based on the total weight of copolymer salt and water-insoluble polymer, the weight ratio of the water-soluble copolymer salt to the water-insoluble polymer being from 35:65 to 85:15, and the amount of surface-active agent being from 2.5 to 11% by weight, based on the sum of the weights of the water-soluble salt and the water-insoluble polymer.

3. An article comprising a substrate having a porous, powdery surface, a coating penetrating the surface and adherent to the substrate comprising the dried deposit of an aqueous composition comprising, dissolved therein, a water-soluble ammonium salt of a copolymer of monoethylenically unsaturated molecules comprising 2 to 15% by weight of a copolymerizable α,β-monoethylenically unsaturated carboxylic acid, the molecular weight being such that the viscosity of a solution of 35% thereof in water at a pH of 6.5 to 7.5 and at 25° C. is about 5 to 100 cps., and dispersed therein, a water-insoluble polymer having an apparent second order transition temperature of not over 30° C., and a viscosity average molecular weight of at least about 100,000, said composition containing a surface-active agent selected from the group consisting of anionic and nonionic surfactants, at least one of the copolymer salt and the water-insoluble polymer containing polymerized units of a monomer having a ureido group therein, the proportion of the latter units being from ¼ to 15% by weight based on the total weight of copolymer salt and water-insoluble polymer, the weight ratio of the water-soluble copolymer salt to the water-insoluble polymer being from 35:65 to 85:15, and the amount of surface-active agent being from 2.5 to 11% by weight, based on the total weight of the water-soluble salt and the water-insoluble polymer.

4. An article comprising an overcoated porous, powdery-surfaced substrate, an outer coating of a water-base paint comprising a water-insoluble addition copolymer, having a $T_i$ not over 20° C. and an intermediate subcoating, penetrating through the powdery surface and adhering to both the substrate and to the outer coating, comprising the dried deposit of an aqueous composition comprising, dissolved therein, a water-soluble ammonium salt of a copolymer of monoethylenically unsaturated molecules comprising 2 to 15% by weight of a copolymerizable α,β-monoethylenically unsaturated carboxylic acid, the molecular weight being such that the viscosity of a solution of 35% thereof in water at a pH of 6.5 to 7.5 and at 25° C. is about 5 to 100 cps., and dispersed therein, a water-insoluble polymer having an apparent second order transition temperature of not over 30° C., and a viscosity average molecular weight of at least 100,000, and a surface-active agent selected from the group consisting of anionic and nonionic surfactants, at least one of the copolymer salt and the water-insoluble polymer containing polymerized units of a monomer having a ureido group therein, the proportion of the latter units being from ¼ to 15% by weight based on the total weight of copolymer salt and water-insoluble polymer, the weight ratio of the water-soluble copolymer salt to the water-insoluble polymer being from 35:65 to 85:15, and the amount of surface-active agent being from 2.5 to 11% by weight, based on the total weight of the water-soluble salt and the water-insoluble polymer.

5. An article as defined in claim 4 in which the substrate is wood which had a chalky paint layer extending over a portion of its surface at the time of application of the subcoating.

6. An article as defined in claim 4 in which the substrate is masonry which had a porous, powdery surface at the time of application of the subcoating.

7. A method of protectively coating a substrate with a water-base paint comprising a water-insoluble addition copolymer having a $T_i$ not over 20° C. which comprises the step of first applying to the substrate at least one coating of an aqueous composition comprising, dissolved therein, a water-soluble ammonium salt of a copolymer of monoethylenically unsaturated molecules comprising 2 to 15% by weight of a copolymerizable α,β-monoethylenically unsaturated carboxylic acid, the molecular weight being such that the viscosity of a solution of 35% thereof in water at a pH of 6.5 to 7.5 and at 25° C. is about 5 to 100 cps., and dispersed therein, a water-insoluble predominantly acrylic polymer having an apparent second order transition temperature of not over 30° C., and a viscosity average molecular weight of at least 100,000, and a surface-active agent selected from the group consisting of anionic and nonionic surfactants, at least one of the copolymer salt and the water-insoluble polymer containing polymerized units of a monomer having a cyclic group therein, the proportion of the latter units being from ¼ to 15% by weight based on the total weight of copolymer salt and water-insoluble polymer, the weight ratio of the water-soluble copolymer salt to the water-insoluble polymer being from 35:65 to 85:15, and the amount of surface-active agent being from 2.5 to 11% by weight, based on the total weight of the water-soluble salt and the water-insoluble polymer, allowing the coated substrate to dry, then applying at least one coat of the aforesaid water-base paint, and allowing each coat to dry before the next is applied.

References Cited by the Examiner

UNITED STATES PATENTS

| 2,881,155 | 5/1959 | Hankins | 260—29.6 |
| 3,035,004 | 5/1962 | Glavis | 260—29.7 |

MURRAY TILLMAN, *Primary Examiner.*

P. LIEBERMAN, *Assistant Examiner.*

UNITED STATES PATENT OFFICE
CERTIFICATE OF CORRECTION

Patent No. 3,300,429 January 24, 1967

Frank J. Glavis et al.

It is certified that error appears in the above identified patent and that said Letters Patent are hereby corrected as shown below:

Column 9, lines 40 to 42, to the left of the formula insert -- (XIV) --. Column 16, line 45, "C.2" should read -- C.1 --; same line 45, "III" should read -- V --.

Signed and sealed this 17th day of February 1970.

(SEAL)
Attest:

Edward M. Fletcher, Jr.
Attesting Officer

WILLIAM E. SCHUYLER, JR.
Commissioner of Patents